Patented Dec. 26, 1939

2,185,152

UNITED STATES PATENT OFFICE 2,185,152

DIAZO DERIVATIVES OF GUANIDYL SULPHONIC ACIDS

Hans Z. Lecher, Plainfield, and Henry Philip Orem, North Plainfield, N. J., assignors, by mesne assignments, to American Cyanamid Company, New York, N. Y., a corporation of Maine No Drawing. Application August 9, 1939,
Serial No. 289,179

6 Claims. (Cl. 260—140)

This invention relates to stabilized diazo compounds in which a diazotized amine free from solubilizing groups is chemically combined with a saturated guanidyl sulphonic acid having at least two carbon atoms between the guanidine radical and the nearest sulphonic acid group. The diazo components will be referred to in the specification and claims as ice color diazo components because of their common use in this type of colors. Diazo compounds, diazotized amines and diazo components when referred to broadly will include compounds containing more than one diazo group or more than one amino group, such as tetrazo compounds or diamines.

According to the present invention, diazotized amines are condensed with a saturated guanidyl sulphonic acid or its alkali metal or ammonium salt in which the guanidyl group has at least one reactive hydrogen attached to the nitrogen atom and capable of reacting with a diazotized amine. The products obtained are of high stability and will not couple with ice color coupling components in alkaline media although they made be split by acid into their original components. The products are thus useful in the printing of ice colors as they permit mixing with a coupling component in a stable alkaline printing paste without producing color and the print can then be developed by treatment with weak acid or acid vapors in the usual manner.

The new stabilized diazo compounds of the present invention correspond most probably to the following general formula:

$$X-(N=N-G)_n$$

in which X is a radical of an ice color diazo component, G is a saturated guanidyl sulphonic acid radical or its alkali metal or ammonium salts in which there are at least two carbon atoms between the guanidine radical and the nearest sulphonic acid group, and n is 1 or 2.

It is not certain just where the azo group connects to the guanidine radical and the present invention is not limited to any particular theory of the formula of the compound. The following sample formula is believed to be the most probable one but it is possible that the azo group of the C=N double bond may be shifted to another nitrogen atom because of tautomerism:

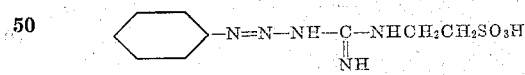

The present invention is not limited to the use of any particular saturated guanidyl sulphonic acid. On the contrary, it is generally applicable to any such compound as long as it contains a reactive hydrogen atom attached to a nitrogen atom and is capable of reacting with diazotized amines such as those used as ice color components. Simple unsubstituted saturated guanidyl sulphonic acids may be used such as e. g. guanidyl ethane, sulphonic acid (guanyl taurine), guanidyl propane sulphonic acids such as alpha guanidyl propane beta sulphonic acid, 2-methyl-2-guanidylpropane sulphonic acid, guanidyl cyclohexane sulphonic acids, or N-alkayl derivatives of such acids as, for instance, guanyl-N-methyltaurine. Polysulphonic acids may also be used such as guanyl imino diethane disulphonic acid having the following formula:

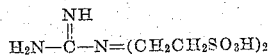

2 -guanidyl - 2 - methylpropane -1,3-disulphonic acid, or guanidyl-tri-(sulphomethyl)-methane having the following formula:

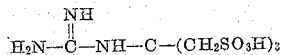

The compound obtained by reacting guanidine with formaldehyde bisulphite is not claimed in this application. The constitution of this guanidine compound is not settled. It may be a guanidyl methane sulphonic acid or it may be a guanidyl methane sulphurous ester. The products obtained by reacting this compound with diazo compounds are obtained in poor yield and quality as compared with the corresponding reaction products from guanidyl alkyl sulphonic acids having more than one carbon atom such as guanyl taurine.

It is an advantage of the present invention that the new stabilized diazo compounds can be produced with practically any ice color diazo component. Typical amines which may be diazotized or tetrazotized and reacted with saturated guanidyl sulphonic acids are the following:

Aniline and its homologues, as e. g. the toluidines, 2,4-dimethylaniline; halogen derivatives of aniline and of its homologues, as e. g. the monofluoroanilines, the monochloroanilines, 2,5-difluoroaniline, 2-fluoro-5-chloroaniline, 2,5-dichloroaniline, m - aminobenzotrifluoride, p - aminobenzotrifluoride, 3-amino-4-chlorobenzotrifluoride, 2-methyl-3-chloroaniline, 2-methyl-4-chloroaniline, 2-methyl-5-chloroaniline, 3-methyl-4-chloroaniline, 5-methyl-2-chloroaniline, 2-methyl-4-chloro-5-bromoaniline, 2-methyl-4,5-dichloroaniline, 4-methyl - 2,5 - dichloroaniline; nitro derivatives of aniline and of its homologues and their halogen derivatives, as e. g. the nitroanilines, 2-methyl-4-nitroaniline, 2-methyl-5-nitroaniline, 4-methyl-2-nitroaniline, 2-nitro-4-fluoroaniline, 2-nitro-4-chloroaniline, 3-nitro-4-chloroaniline, 4-nitro-2-chloroaniline; ether derivatives of primary aromatic amines and their halogen derivatives, as e. g. o-anisidine, 2-methoxy-5-methyl aniline, 2,5-dimethoxy-aniline, 2-methoxy-1-naphthylamine, 2-amino-diphenyl-ether, 2-amino-4-acetyl-diphenylether, benzyl-2-aminophenyl-ether, 3-fluoro-4-methoxy-aniline, 2-methoxy-5-chloroaniline, 2,5 - dimethoxy- 4 - chloroaniline, 2-methoxy-4 - chloro - 5 - methyl aniline, 2-methoxy-5-bromoaniline, 3-bromo-6-ethoxyaniline, 4-chloro-2-amino-diphenylether, 4-amino-2-chloro-diphenylether, 4 - amino- 4'-chloro-diphenylether, 4,4'-dichloro-2-amino-diphenylether, 2,2',5'-trichloro-4-amino-diphenylether; ether derivatives of aniline and its homologues containing nitro groups, as e. g. 2-methoxy-4-nitro-aniline, 2-methoxy-5-nitroaniline, 2-nitro-4-methoxyaniline, 2-methoxy-4 - nitro-5 - methyl-aniline; monoacyl derivatives of aromatic diamines, as e. g. N-hexahydrobenzoyl-p-phenylene diamine, N - hexahydrobenzoyl - p - toluylene diamine, N-benzoyl-p-phenylene diamine; monacyl derivatives of diaminophenol ethers, as e. g. 2-benzoylamino-4- aminoanisole, 2-hexahydrobenzoylamino - 5 - aminoanisole, 2-amino-5-benzoylamino-hydroquinone dimethylether and diethylether, 2-amino-5-hexahydrobenzoylamino-hydroquinone dimethylether and diethylether, 2-amino-5-butyrylamino-hydroquinone dimethylether and diethylether, 2-amino-5-phenoxyacetylamino-hydroquinone diethyl ether, the monomethyl and the monobenzyl and the monophenyl urethane of 2,5-diaminohydroquinion dimethylether and diethylether, 1-amino-3-benzoylamino - 4,6 - dimethoxybenzene, analogous monoacyl derivatives of 2,5-diamino-4-alkoxy-toluenes and of 2,5-diamino-4-alkoxychlorobenzenes and of 2,5-diamino-4-alkoxy-benzene sulphodialkylamides; analogous monacyl derivatives of 1,3-diamino-4,6-dimethylbenzene; the diethylamide of 2-amino-4-(4'-chlorophenoxy)-benzoic acid; monoacyl derivatives of diamino-p-chloro phenyl ethers as e. g. 2-amino-4-chloro-5-acetylamino-diphenylether, 2-benzoyl-amino-4-chloro-5-aminoanisole; amino derivatives of aromatic sulphones as e. g. 3-amino-4-methyl-diphenyl sulphone, 2-amino-4'-methyl-diphenyl sulphone, 2-amino-4-acetyl-diphenyl sulphone, the ethyl ester of 3-amino-4-(p-toluene-sulphonyl)-benzoic acid, 4-methoxy-3-amino-phenylethyl sulphone, (4-methoxy - 3 - amino-phenyl)-benzyl sulphone, 4-ethoxy-3-amino-diphenyl sulphone, 2-amino-4-(trifluoromethyl)-phenyl-ethyl sulphone; amino derivatives of aromatic dialkylsulphonamides as e. g. 3-amino-4-methyl-benzene dimethylsulphonamide and diethylsulphonamide, 3-amino-4-methoxybenzene diethylsulphonamide; xenylamine; alpha and beta naphthylamine; alpha aminoanthraquinone; 2-amino-3-nitro-fluorene and 2-amino-3-nitro-fluorenone; amino-diarylamines and their ether derivatives and their nitro derivatives as e. g. 2-methoxy-5-amino-diphenylamine, 4-methoxy-4'-amino-diphenylamine, 4'-ethoxy-4'-amino-diphenylamine, 3,4'-dinitro-4-amino-diphenyl-amine; amino-azo compounds as e. g. 3,2'-dimethyl-4-amino-azo-benzene, 2-methyl-4-amino-5-methoxy-4'-chloro-azobenzene, 4-amino-4'-nitro-3-methoxy-6-methyl-azobenzene, 4-amino-4'-nitro-2,5-dimethoxy-azobenzene, 4-amino-4'-chloro-3-methoxy-6-methyl azobenzene, the azo dye: diazotized o-anisidine coupled onto alpha-naphthylamine.

There are also aromatic diamines in which only one of the amino groups is diazotized and such amino diazo compounds may also be condensed with saturated guanidyl sulphonic acids to form products of the present invention. An example of this type of amine is 2,6-dichloro-1,4-phenylene diamine. Diamines in which both amino groups are diazotized to form tetrazo compounds will also condense with the guanidyl sulphonic acids. Typical amines of this class are p-phenylene diamine, benzidine, o-tolidine, o-dianisidine, 4,4'-diaminostilbene, 4,4'-diaminodiphenylamine, 2,2-dimethyl - 4,4'-diamino-diphenylamine and 1,5-diamino-naphthalene.

Diazo and tetrazo compounds of heterocyclic amines can also be condensed with guanidyl sulphonic acids in accordance with the present invention. Typical heterocyclic amines are 2-amino-carbazole, 3,6-diaminocarbazole, 2-nitro-3-aminocarbazole, 2-nitro-3-aminodibenzofuran, 2-amino-3-nitrobenzothiophene, 1-amino-5-fluorobenzothiazole:

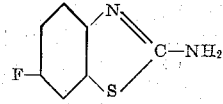

The condensation of the diazotized amines with the guanidyl sulphonic acids is carried out in alkaline medium. The optimum pH, however, will vary to some extent with the particular diazo components and with the particular guanidine derivatives used. In general, there will be an optimum pH or pH range for each pair of reaction components.

In many cases an excess of the guanidine compound is of advantage and it is possible to use such an excess without reagent waste as this excess may be recovered if desired.

The concentration and the temperature at which the reaction is advantageously carried out will, of course, vary with the reaction components used. However, in general it is advisable to maintain a low temperature and a low concentration.

Since the stabilized diazo compounds of the present invention contain a solubilizing sulphonic group, they are soluble in aqueous alkali or in aqueous solutions of ammonia, of amines or of quaternary ammonium bases. While in the case of alkali and of the strong quarternary ammonium bases such as tetramethylammonium hydroxide only an equivalent amount, or a slight excess, of the base is required to promote solution; in the case of the weaker bases, such as ammonia and the various amines, a larger excess is required.

The isolation of the stabilized diazo compounds of this invention may be effected by salting out or by internal salt formation through the addition of acids. The method of salting out in alkaline medium is generally preferable as the compounds are not very stable to acids and even the use of weak acids may cause some decomposition.

The compounds are, for the most part, yellow in color. They are very stable even at elevated temperatures and not explosive which is important as many diazo compounds present considerable explosion hazard. The ready solubility of the compounds of the present invention in solutions of bases quoted above, and the stability against hydrolysis in alkaline solutions, is another important property and constitutes one advantage of the present invention.

The products of the present invention are split by acid in aqueous solution and regenerate the component parts of the molecules. The ease with which the compounds are split with acid will, of course, differ with different compounds, but in most cases heating with acetic acid is sufficient to effect splitting. From the practical point of view, it is important that in this manner an ice color component can be converted into a very stable diazo compound from which, however, the diazotized amine may be easily regenerated by the aid of the acids.

Because of those desirable properties, the stable diazo and tetrazo compounds of the present invention can be used mixed with ice color coupling components in alkaline printing pastes. Prints can be developed with steam containing vapors of weak acids such as formic or acetic acid. When the diazo compounds of the present invention are used in the form of salts with weak and volatile amines or are dissolved by the aid of weak and volatile amines such as e. g. diethyl ethanolamine, the development of the color may be accomplished by steam only without any additional acid because the steam removes the amine and decreases th alkalinity of the printing paste. The same is true if there is added to the printing paste a potential acidic substance which will produce an acid on steaming, such as e. g. sodium monochloroacetate, the monoacetyl ester of glycerine. ethylene monochlorohydrin, formamide, etc. Furthermore, in making up the printing paste, if insufficient amounts of base are used and some of the stabilized diazo compound and the coupling component remains undissolved, the prints may be developed with steam alone, without any addition of acid or of a potential acidic substance.

The present invention, however, is not concerned with the processes of using the stabilized diazo compound, this forming a part of the subject matter of our copending application, Serial No. 289,180, filed August 9, 1939. The present invention relates to the stabilized diazo compounds as new chemical compounds and to the process of producing them.

The invention will be described in conjunction with the following specific examples which are merely illustrative and not intended to limit the scope of the invention. The parts are by weight.

*Example 1*

22.3 parts of 2-methyl-5-chloroaniline hydrochloride are stirred for ½ hour with 525 parts of water. Then 16.7 parts of 38% hydrochloric acid are added, and stirring is continued for ½ hour. The temperature is lowered to 0° C. by the addition of ice, and the mixture is diazotized with a solution containing 8.8 parts of sodium nitrite in 13 parts of water.

31.5 parts of guanyl taurine,

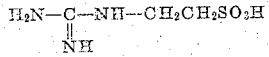

are added to the diazo solution so prepared, and 96.0 parts of 5N potassium hydroxide are added at 3° C. and the solution is allowed to stir for 6 to 8 hours. The reaction mixture is then filtered and the filtrate is treated with 70 parts of potassium carbonate for each 100 parts of solution. The precipitated solid is filtered off, pressed and dried to give a bright yellow product readily soluble in water.

5.75 parts of the product (containing 60.7% real stabilized diazo compound) are blended with 2.91 parts of 2-hydroxy-3-naphthoic acid ortho toluidide. 5 parts of the blend are dissolved by pasting with 5 parts of ethylene glycol-monoethylether, 2.5 parts of 30° Bé. sodium hydroxide, and 17.5 parts of water. The solution is thickened by addition of 70 parts of a gum starch tragacanth solution. This print paste is printed from a copper roll on cotton, the print is dried, and is developed by steam in the presence of acetic acid vapors. The developed print is rinsed with water, soaped at elevated temperature, and dried. A bright red print of very good fastness properties is obtained.

*Example 2*

24.4 parts of ortho dianisidine are stirred with 600 parts of water and 42 parts of 38% hydrochloric acid, and the mixture is heated to the boil to complete solution. The solution is filtered while hot, is iced to 0° C., and is tetrazotized by adding 220 parts of normal sodium nitrite solution over a period of two hours at a temperature below 5° C. The diazo solution is filtered and 40 parts of guanyl taurine are added to the filtrate, and then 105 parts of 5N potassium hydroxide are added rapidly at 3° C. This solution is allowed to stir for 6 to 8 hours, is filtered, and the filtrate is treated at 20° C. with 70 parts of potassium carbonate for each 100 parts of solution. The precipitated product is filtered, pressed and dried, yielding a brown product which is extremely soluble in water.

4.45 parts of the product (containing 72.5% of real stabilized diazo compound) are blended with 2.91 parts of 2-hydroxy-3-naphthoic acid ortho-toluidide, 0.1 part of a previously neutralized and dried sulphonated castor oil, and 2.5 parts of cane sugar. 5.0 parts of this blend, when printed on cotton in a manner similar to the procedure described in Example 1 yields a strong, blue print of fair fastness properties.

When 3.52 parts of a product (containing 91.5% real stabilized diazo compound) are blended with 3.22 parts of 2-hydroxy-3-naphthoic acid orthophenetidide and 1.80 parts of urea and 5 parts of this blend are printed on cotton by a similar procedure, a bright blue print is produced.

When 3.52 parts of a product (containing 91.5% of real stabilized diazo compound) are blended with 2.76 parts of 2-hydroxy-3-naphthoic acid anilide and 1.41 parts of urea and 5 parts of this blend are printed on cotton by a similar procedure, a reddish blue print is obtained.

*Example 3*

6.2 parts of o-dianisidine, 50 parts of water, and 32 parts of 5N hydrochloric acid are cooled to 3° C. and 3.5 parts of sodium nitrite in 7.5 parts of water are added until tetrazotization is complete. 10 parts of guanyl taurine and 35.5 parts of 5N sodium hydroxide are added slowly with stirring. After the tetrazo compound has reacted completely, the reaction mixture is filtered and the filtrate is treated with 24 parts of common salt for each 100 parts of solution. The product is extremely soluble in water.

3.2 parts of the product are blended with 2.9 parts of 2-hydroxy-3-naphthoic acid-o-toluidide. When the blend is printed on cotton according to the procedure described above under Example 1, a strong blue print is obtained.

Example 4

22.3 parts of 2-methyl-5-chloroaniline hydrochloride are diazotized in the same manner as in Example 1. 36.5 parts of 2-guanidyl-2-methyl-propane sulphonic acid,

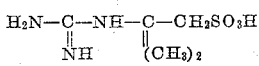

are added to the diazo solution. 96 parts of 5N potassium hydroxide are added at 5° C. and the mixture stirred until the diazo compound has disappeared. The reaction product is then salted out by the addition of potassium carbonate, filtered off, pressed and dried.

This product, when blended with the o-phenetidide of 2-hydroxy-3-naphthoic acid and printed in a manner similar to that used in Example 1, gives a bright scarlet print of very good fastness properties.

The guanidyl sulphonic acid used in Example 4 may be prepared from 2-amino-2-methyl-propanol by reacting its hydrochloride with thionylchloride to form 2-amino-2-methyl-propyl chloride, replacing it by —SO₃Na and condensing the amino group with cyanamide.

Example 5

22.3 parts of 2-methyl-5-chloroaniline hydrochloride are diazotized as in Example 1. Then 39.3 parts of 2-guanidyl-cyclohexane sulphonic acid,

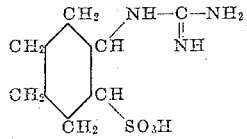

are added to the diazo solution. The solution is rendered alkaline by the addition of 96 parts of 5N potassium hydroxide solution at low temperature and the mixture is stirred until the diazo compound has disappeared. The reaction product is salted out by the addition of potassium carbonate, filtered off, pressed and dried.

This product, when blended with the o-toluidide of 2-hydroxy-3-naphthoic acid and printed in a manner similar to that described in Example 1, gives a bright red print of very good fastness properties.

The guanidyl sulphonic acid used in this Example 5 may be prepared from 2-amino-hexanol in a manner analogous to that mentioned in Example 4.

In the claims the terms "diazo compounds" and "diazo components" are used in a broad sense to include compounds having one or more diazo groups such as diazotized compounds, tetrazotized compounds, and the like. It should be understood that the above terms will have no other meaning.

What we claim is:

1. Stabilized diazo compounds having the following general formula:

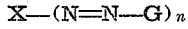

in which X is a radical of an ice color diazo component, G is a radical included in the group consisting of saturated aliphatic and cycloaliphatic guanidyl sulphonic acid radicals and their alkali metal and ammonium salts having at least two carbon atoms between the guanidine and the nearest sulphonic group, and n is a whole number included in the group consisting of 1 and 2.

2. Stabilized diazo compounds having the following formula:

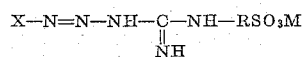

in which X is a radical of an ice color diazo component, M is a member of the group consisting of hydrogen, alkali metals and ammonium radicals, and R is a saturated aliphatic radical having at least two carbon atoms between the guanidine and the sulphonic group.

3. Stabilized diazo compounds having the following formula:

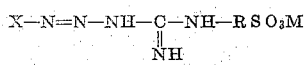

in which X is a radical of an ice color diazo component, M is a member of the group consisting of hydrogen, alkali metals and ammonium radicals, and R is a saturated carbocyclic radical.

4. Stabilized diazo compounds having the following formula:

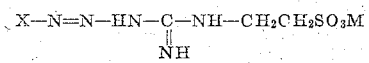

in which X is a radical of an ice color diazo component and M is a member of the group consisting of hydrogen, alkali metals and ammonium radicals.

5. The stabilized diazo compound having the following formula:

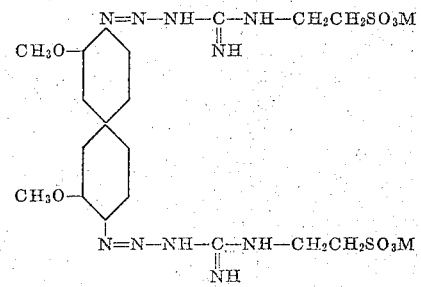

in which M is a member of the group consisting of hydrogen, alkali metals and ammonium radicals.

6. Stabilized diazo compounds having the following formula:

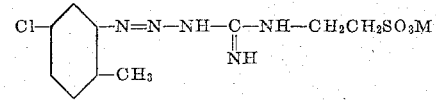

in which M is a member of the group consisting of hydrogen, alkali metals and ammonium radicals.

HANS Z. LECHER.
HENRY PHILIP OREM.